(No Model.)

P. HIGGS.
THERMO ELECTRIC BATTERY.

No. 244,235. Patented July 12, 1881.

Attest:
Geo. N. Graham
Wylly Hodges

Inventor,
Paget Higgs
per Chas. W. Forbes
Attorney

UNITED STATES PATENT OFFICE.

PAGET HIGGS, OF NEW YORK, N. Y., ASSIGNOR TO JAMES C. REED, OF SAME PLACE.

THERMO-ELECTRIC BATTERY.

SPECIFICATION forming part of Letters Patent No. 244,235, dated July 12, 1881.

Application filed March 1, 1881. (No model.)

*To all whom it may concern:*

Be it known that I, PAGET HIGGS, a citizen of Great Britain, residing in the city, county, and State of New York, have invented certain new and useful Improvements in Thermo-Electric Batteries, of which the following is a full, clear, and exact description, reference being had to the drawings, in which—

Figure 5:
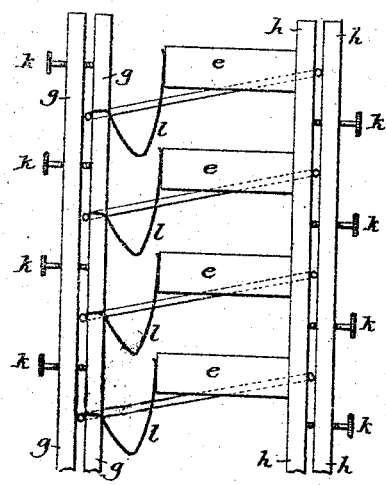

Figures 1, 2, 3, and 4 illustrate the principle of the invention. Fig. 5 represents a vertical, and Fig. 6 a horizontal, section of one form of the invention, and Fig. 7 a perspective view of another form.

It is the object of my invention to render of practical use the heretofore-discovered principle in thermo-electrical science that where two parts of an otherwise homogeneous mono-metallic circuit are in a different state of mechanical tension the two parts can for thermo-electric purposes be considered as two different metals and constitute a thermo-electric couple from which a current can be obtained by the proper application of heat.

The invention, in its several parts, consists in the construction of a practical thermo-electric battery or pile from which a working current can be obtained and in which the elements are constructed from a single piece of metal or alloy, or from metal or alloy of one kind; and it also consists in the various details hereinafter pointed out by which the pile is made practically useful. It will be best understood from the following description of the battery and its principles.

Figure 1:
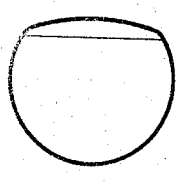
Figure 2:
Figure 3:
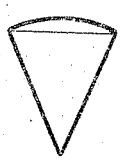
Figure 4:
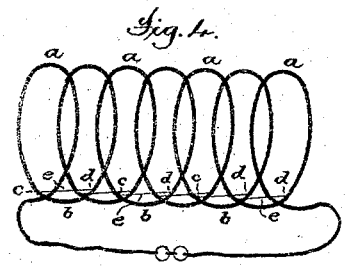

If a circle of wire be subjected to tension by means of a stretcher upon its diameter the two halves of the circle will be equally strained; but if the stretcher constitute a chord of the circle at a considerable distance from the center, it is obvious that the smaller arc will be subjected to a greater strain than the greater. Such a circle is shown in Fig. 1 and will constitute a thermo-electric couple, and if it be subjected to different degrees of temperature at the points where the unequally-stretched portions meet—that is, at the ends of the stretcher—an electric current will be maintained through the circle (the stretcher being a non-conductor) which may be tested by a galvanometer. The same principle, of course, applies to a wire circuit in the form of an ellipse where the stretcher is at a considerable distance from any axis of the ellipse, Fig. 2, and even to a triangular circuit, Fig. 3, or any oblate figure.

To construct a battery on this principle, I take a coil of wire, preferably of iron, (though other metal or an alloy would answer,) and for such purposes I find a Swedish iron which is very soft and ductile to be best suited. I also prefer that the coil should be of such shape that its normal section—that is, the section perpendicular to the axis of the coil—should tend to the elliptical rather than the circular, though, as before seen, its shape does not affect the principle. In the interior of this coil I place a stretcher or series of stretchers at a distance from the axis of the coil, in such a manner that each circle of the coil will be in its constituent portions unequally stretched, the parts which are most stretched all lying upon one side of the stretchers and those less stretched upon the other. If, now, the ends of the coil be connected by a conductor so as to make a complete circuit and the parts of the coil at $c$ heated while the parts at $d$ remain cold, a current will pass through the wire varying in its qualities with the size of the wire, the difference in the tension of the two sections of the coil and the difference in temperature between the parts $c$ and parts $d$, which represent respectively the hot and cold ends of a series of thermo-electric couples, constituting a metallic circuit.

Figure 6:
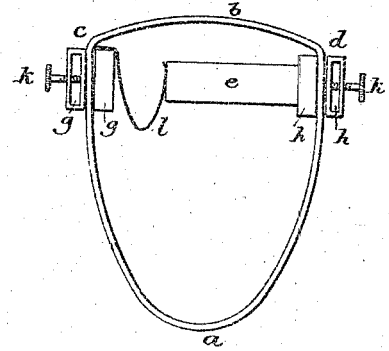

Fig. 5 represents a vertical and Fig. 6 a horizontal section of the coils, showing in detail one of the arrangements I have devised for stretching the wires.

$g$ $g$ are two wooden or non-conducting strips, placed one without and the other within the coils parallel to its axis. They are connected with each other by binding-screws $k$, by means of which they are clamped to the wires sufficiently to prevent the strips slipping on the latter. $h$ $h$ are similar strips, similarly placed on the other side of the coil, and so that the plane of all the strips will divide the coils into two unequal sections.

$e$ $e$ $e$ are non-conducting stretchers, of which one end bears against the inner strip, $h$. The other ends are connected to metallic springs $l$, while the other ends of the springs bear against and are connected with the inner strip, $g$. It will be advantageous, however, if they also pass around the strip and connect with the wires, so as more readily to receive heat from the latter. They are so constructed as to expand when heated, and are shown in different positions in Figs. 5 and 6, so that the drawings will be more easily understood. They might occupy either position.

Instead of the springs, screws might be placed between the stretchers $e$ and strip $g$, so constructed that by turning them the distance between the strips $h$ and $g$ would be increased.

By the original construction of the stretchers and springs, or by turning the screws, the sections $b$ of the wire may be subjected to any desired degree of tension in the cold condition of the battery. If, now, heat be applied in any manner to the strips $g$ $g$ or to the wires at the points $c$, so that the latter become heated at those points to a higher degree than at $d$, the springs or screws will become heated, as also a portion of the stretchers $e$, and the whole stretcher expanding will increase the difference in tension between sections $a$ and $b$, or create such a difference, and the entire coil, the ends of which are connected, will constitute an electric circuit, including a series of thermo-electric couples, with a different temperature at their opposite points of junction, whereby a current will be created and maintained as long as the difference continues.

Instead of the strips $g$ and $h$ the stretchers may be entirely disconnected from each other, and the ends of each provided with suitable clamping devices, so as not to slip. There are many devices which are well known and which would be suitable for the purpose. Care must, however, be taken to insulate at least one end of this stretcher from the wires.

Suitable devices can also be provided for expanding the stretchers by mechanical means alone, such as the screws I have above referred to, placing no reliance upon the expanding action of the heat, and such expanding stretchers might be connected by a common mechanism, so that they could be operated together and by a single action.

Instead of the outer strips, $g$ and $h$, tubes may be placed through which continual streams of water, one hot and one cold, may run for the purpose of maintaining the difference in temperature of the ends of the couples. This difference may be maintained in a variety of ways well known to experimenters in thermo-electric effects, the principal point being that the heat should not vary, as upon its constancy depends that of the current.

Figure 7:
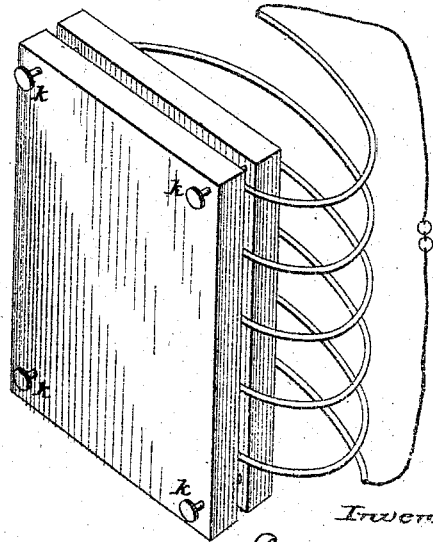

Instead of stretching the coils a section of them might be subjected to pressure by suitable devices, such as enlarging the strips $g$ $g$, so that the portions of wires inclosed between them should be sufficiently long to maintain a difference in temperature at their ends, and then compressing that portion by the screws $k$, as in Fig. 7.

It will be seen that while the above specified details constitute portions of my invention, the principal feature is the construction of a battery of a single piece of metal or of one metal, by stretching or compressing a portion of the coils, and that this feature may be maintained while the details are varied indefinitely.

Specifying the invention more specifically, I claim as my invention—

1. The battery consisting of a coil of wire divided by suitable means into sections, which alternately have a greater and less degree of mechanical tension, substantially as described.

2. A battery consisting of a coil of wire divided by suitable means into sections which are alternately subjected to mechanical compression and in a natural condition.

3. A thermo-electric tension-battery provided with means whereby the same heat which creates the current also operates to create the difference in tension, substantially as described.

4. In combination with the thermo-electric coil, the heat-expanding stretchers $l$ $e$, or their equivalents.

5. A thermo-electric coil, in combination with the series of stretchers placed at one side of its axis.

6. A thermo-electric coil, in combination with a series of stretchers connected with the coils at the heating end and insulated at the cold end.

7. The clamping-strips $g$ $g$ $h$ $h$, or their equivalents, as a means of preventing the stretchers from slipping on the coils, substantially as described.

PAGET HIGGS.

Witnesses:
WYLLYS HODGES,
WILLIAM HILLIARD.